United States Patent [19]

Iwasaki

[11] Patent Number: 5,795,635
[45] Date of Patent: Aug. 18, 1998

[54] OIL HOSE

[75] Inventor: Yasunori Iwasaki, Kawasaki, Japan

[73] Assignee: Nippon Zeon Co., Ltd., Tokyo, Japan

[21] Appl. No.: 583,035

[22] PCT Filed: Jul. 8, 1994

[86] PCT No.: PCT/JP94/01126

§ 371 Date: Jan. 5, 1996

§ 102(e) Date: Jan. 5, 1996

[87] PCT Pub. No.: WO95/01854

PCT Pub. Date: Jan. 19, 1995

[30] Foreign Application Priority Data

Jul. 9, 1993 [JP] Japan ................... 5-194028

[51] Int. Cl.$^6$ ............................................. F16L 11/04
[52] U.S. Cl. .................. 428/36.3; 428/36.8; 428/36.91;
428/519; 428/520; 428/521; 428/522; 138/126;
138/141; 138/153
[58] Field of Search ...................... 428/36.8, 36.9,
428/36.91, 36.2, 36.3, 521, 522, 519, 520;
138/126, 137, 140, 141, 153; 525/233,
238

[56] References Cited

U.S. PATENT DOCUMENTS

| | | | |
|---|---|---|---|
| 4,486,480 | 12/1984 | Okumoto et al. | 428/36.8 |
| 4,606,952 | 8/1986 | Sugimoto et al. | 428/36.8 |
| 4,734,305 | 3/1988 | Sugimoto et al. | 438/126 |
| 4,806,351 | 2/1989 | Sugimoto et al. | 428/36.8 |
| 4,905,735 | 3/1990 | Akiyoshi | 138/126 |
| 4,957,792 | 9/1990 | Shizuo et al. | 138/126 |
| 4,988,548 | 1/1991 | Takemura et al. | 428/36.8 |
| 5,093,166 | 3/1992 | Nishimura | 428/36.9 |
| 5,356,681 | 10/1994 | Ichikawa et al. | 428/36.91 |
| 5,380,571 | 1/1995 | Ozawa et al. | 428/36.91 |

FOREIGN PATENT DOCUMENTS

| | | |
|---|---|---|
| 1202579 | 10/1982 | Canada . |
| 1202579 | 4/1986 | Canada . |
| 0553442 | 8/1993 | European Pat. Off. . |
| 60-11776 | 1/1985 | Japan . |
| 62-51439 | 3/1987 | Japan . |
| 63-116836 | 5/1988 | Japan . |
| 55-121054 | 9/1996 | Japan . |

*Primary Examiner*—Rena Dye
*Attorney, Agent, or Firm*—Birch, Stewart, Kolasch & Birch,LLP

[57] ABSTRACT

An oil hose comprised of (i) an inner layer made of a vulcanized hydrogenated nitrile rubber composition, an intermediate layer made of a vulcanized unsaturated nitrile-conjugated diene copolymer rubber composition, and an outer layer made of a vulcanized ozone-resistant rubber composition, or (ii) an inner layer made of a vulcanized rubber composition comprising a hydrogenated copolymer rubber composed of an unsaturated nitrile, a conjugated diene and a copolymerizable ethylenically unsaturated monomer, and an outer layer made of a vulcanized ozone-resistant rubber composition. This hose has good oil resistance, thermal resistance and copper ion resistance, and caulking in the portion thereof connected to a copper pipe is strong and oil leakage at a low temperature is prevented.

14 Claims, No Drawings

OIL HOSE

TECHNICAL FIELD

This invention relates to an oil hose having improved copper ion resistance, thermal resistance and resistance to oil leakage at a low temperature.

BACKGROUND ART

As a rubber material for a power steering hose on an automobile and other oil hoses, an acrylonitrile-butadiene copolymer rubber (NBR) has heretofore been used. To make more and more harmless an exhaust gas from an automobile, the temperature in an atmosphere around an engine becomes higher than ever, and the temperature of oil circulating through oil hoses also becomes higher. Conventional NBR hoses have a poor thermal resistance, and therefore, a rubber material having an enhanced thermal resistance is desired.

To meet the demand for thermal-resistant oil hoses, hydrogenated NBR are used which exhibits good thermal resistance and oil resistance. However, hydrogenated NBR has a problem in that oil leakage is apt to be caused at the caulked portion of a hydrogenated NBR hose at a low temperature. This problem cannot be solved even where the oil hose is made of a mixed material composed of NBR and hydrogenated NBR.

DISCLOSURE OF INVENTION

An object of the present invention is to provide an oil hose having a high thermal resistance, an enhanced resistance to oil leakage at a low temperature, and a good resistance to copper ions.

In one aspect of the present invention, there is provided an oil hose (hereinafter referred to as "first oil hose") comprised of an inner layer, an intermediate layer and an outer layer, characterized in that the inner layer, the intermediate layer and the outer layer are made of a vulcanized hydrogenated nitrile rubber composition, a vulcanized conjugated diene rubber composition and a vulcanized ozone-resistant rubber composition, respectively.

In another aspect of the present invention, there is provided an oil hose (hereinafter referred to as "second oil hose") comprised of an inner layer and an outer layer, characterized in that the inner layer is made of a vulcanizate of a hydrogenated nitrile rubber composition comprising a hydrogenated nitrile rubber having an iodine value not larger than 120, which is obtained by hydrogenating the conjugated diene units of a copolymer rubber of an unsaturated nitrile, a conjugated diene and a copolymerizable ethylenically unsaturated monomer, and the outer layer is made of a vulcanized ozone-resistant rubber composition.

BEST MODE FOR CARRYING OUT THE INVENTION

The first oil hose of the present invention has a three-layer structure comprised of an inner layer placed in contact with oil, an intermediate layer formed on the inner layer, and an outer layer exposed to the air.

The inner layer is made of a vulcanizate of a hydrogenated nitrile rubber composition. As examples of the hydrogenated nitrile rubber, there can be mentioned a nitrile rubber obtained by hydrogenating the conjugated diene units of an unsaturated nitrile-conjugated diene copolymer rubber, and a nitrile rubber obtained by hydrogenating the conjugated diene units of a copolymer rubber of an unsaturated nitrile, a conjugated diene and a copolymerizable ethylenically unsaturated monomer. These hydrogenated nitrile rubber may be used either alone or in combination. The hydrogenated nitrile rubber preferably has a Mooney viscosity of 5 to 200. The copolymer rubber to be hydrogenated is comprised of 5 to 60% by weight of units of an unsaturated nitrile monomer, 15 to 95% by weight of units of a conjugated diene monomer and 0 to 80% by weight of units of a copolymerizable ethylenically unsaturated monomer. The hydrogenated nitrile rubber is obtained by hydrogenating this copolymer rubber.

In view of the thermal resistance and copper ion resistance (the copper ion resistance means a resistance to copper ions dissolved out in oil from a copper pipe to which the hose is connected), required for the hose of the present invention, the degree of hydrogenation should be such that the iodine value as measured according the Japanese Industrial Standard is not larger than 120, preferably 1 to 80, and more preferably 1 to 50. JAPANESE INDUSTRIAL STANDARD K 0070 (1992).

Test Methods for Acid Value, Saponification Value, Ester Value, Iodine Value, Hydroxyl Value and Unsaponifiable Matter of Chemical Products.

2.1 Definition of terms (4) Iodine value

The amount of bound halogen as measured when a halogen is allowed to react with 100 g of a specimen is expressed in terms of gram number of iodine.

6. Iodine Value Iodine value is determined as follows.

(1) Summary: A specimen is dissolved in carbon tetrachloride or cyclohexane, an iodine monochloride solution is added to the specimen solution. The mixed solution is allowed to stand in a dark place, and potassium iodide and water are added into the mixed solution. The mixed solution is titrated with a sodium thiosulfate solution and, when the color of the mixed solution becomes light yellow, a starch solution is added gradually until the color disappears.

(2) Reagents:

(2.1) Carbon tetrachloride JIS K 8459

(2.2) Cyclohexane JIS K 8464

(2.3) Iodine monochloride solution (Wijs solution) is prepared by the following method (a) or (b).

(a) Acetic acid according to JIS K 8355 is added separately to 7.9 g of iodine trichloride according to JIS K 8403 and to 8.9 g of iodine according to JIS K 8920. The thus-prepared two solutions are mixed together and acetic acid is further added thereto to give one liter of a mixed solution.

(b) 13 g of iodine is dissolved in 1 liter of acetic acid, and 20 ml of the iodine solution is titrated with a 0.1 mol/l sodium thiosulfate solution (the amount of titration is referred to as "first titration amount"). Dry chlorine is blown into an iodine solution, and, in 20 ml of the iodine solution, about 15 ml of a potassium iodide solution and about 100 ml of water are added. The thus-obtained mixed solution is titrated with a 0.1 mol/l sodium thiosulfate solution (the amount of titration is referred to as "second titration amount"). The second titration amount is about twice of the first titration amount.

(2.4) Potassium iodide solution (100 g/l) is prepared from potassium iodide according to JIS K 8913.

(2.5) 0.1 mol/l sodium thiosulfate solution JIS K 8001, 4.5 (01. mol/l sodium thiosulfate solution (2.482 g $NA_2S_2O_3 5H_2O/1$)).

(2.6) Starch solution (10 g/l): 1 g of starch according to JIS K 8659 is mixed with a minor amount of water, and the mixture is added in 100 l of boiling water. The mixture is boiled for several minutes to be thereby rendered transparant, and then, is cooled.

(3) Apparatus: Erlenmeyer flask with a plug having a long neck and a volume of 200 to 500 ml.

(4) Procedure (a) A specimen is weighed with three significant figures in an Erlenmeyer flask with a plug according to Table 3.

(b) About 10 ml of carbon tetrachloride or cyclohexane is added to dissolve the specimen.

(c) 25 ml of an iodine monochloride solution is added by a pipet, and the flask is swirled.

(d) The flask is plugged and is placed in a dark place at room temperature for a working time shown in Table 3.

(e) About 20 ml of potassium iodine solution (100 g/l) and about 100 ml of water are added into the flask.

(f) The content in the flask is titrated with a 0.1 mol/l sodium thiosulfate solution and, when the color of the solution becomes light yellow, several drops of a starch solution (10 g/l) are added. The titration is continued until the blue color disappears. The potential difference titration may be used for determining the end point.

(g) Blank test is carried out by the above procedures (b) through (f) without the specimen.

monomer copolymerizable with the conjugated diene monomer and the unsaturated nitrile monomer, there can be mentioned unsaturated carboxylic acids such as acrylic acid, methacrylic acid, fumaric acid, itaconic acid and maleic acid; monoalkyl esters and dialkyl esters of unsaturated carboxylic acids such as methyl acrylate, butyl acrylate, monomethyl itaconate, dimethyl itaconate, monobutyl itaconate, dibutyl itaconate, mono-methyl maleate, dimethyl maleate, monobutyl maleate and dibutyl maleate; alkoxyalkyl esters of unsaturated carboxylic acids such as methoxy acrylate, ethoxyethyl acrylate and methoxyethoxyethyl acrylate; cyanoalkyl group-having acrylates such as α- and β-cyanoethyl acrylates, α-, β- and γ-cyanopropyl acrylates and cyanobutyl acrylate; and hydroxyl group-having acrylates such as 2-hydroxyethyl acrylate and 2-hydroxypropyl acrylate. Of these, dialkyl esters of unsaturated dicarboxylic acids are preferable. Dibutyl fumarate and dibutyl itaconate are especially preferable.

As specific examples of the above-mentioned copolymer rubber, there can be mentioned an acrylonitrile-butadiene copolymer rubber, an acrylonitrile-isoprene copolymer rubber, an acrylonitrile-butadiene-isoprene copolymer rubber, an acrylonitrile-butadiene-butyl acrylate copolymer rubber and an acrylonitrile-butadiene-dibutyl fumarate copolymer rubber.

The intermediate layer formed on the above-mentioned inner layer is made of a vulcanizate of a conjugated diene rubber. The intermediate layer is indispensable for strength-

TABLE 3

| Iodine value A | <3 | 3≦<10 | 10≦<30 | 30≦<50 | 50≦<100 | 100≦<150 | 150≦<200 | 200≦ |
|---|---|---|---|---|---|---|---|---|
| Specimen amount (g) | 5–3 | 3.0–2.5 | 2.5–0.6 | 0.60–0.40 | 0.30–0.20 | 0.20–0.12 | 0.15–0.10 | 0.12–0.10 |
| Working time (min) | 30 | 30 | 30 | 30 | 30 | 60 | 60 | 60 |

(5) Calculation

The iodine value A is calculated as follows.

$$\text{Iodine value } A = \{(B-C) \times f \times 1.2.6.9\}/S$$

where:

A=iodine value

B=ml of 0.1 mol/l sodium thiosulfate solution required for titration of the blank, C=ml of 0.1 mol/l sodium thiosulfate solution required for titration of specimen, f=factor of 0.1 mol/l sodium thiosulfate solution, S=grams of specimen used, and 1.269=atomic weight of iodine 126.9×1/100. The amount of the units of an unsaturated nitrile monomer in the copolymer rubber can be determined within the above range depending upon the intended use of the hose (i.e., the particular kind of oil contacted with the hose).

As examples of the conjugated diene monomer for the above-mentioned copolymer rubber, there can be mentioned butadiene, 2,3-dimethyl butadiene, isoprene and 1,3-pentadiene. Of these, butadiene is preferable. As examples of the unsaturated nitrile monomer, there can be mentioned acrylonitrile and methacrylonitrile. Of these, acrylonitrile is preferable. As examples of the ethylenically unsaturated ening the caulked portion of the hose and thus preventing oil-leakage, especially at a low temperature. As examples of the conjugated diene rubber, the above-listed unsaturated nitrile-conjugated diene rubbers, aromatic vinyl compound-conjugated diene copolymer rubbers and conjugated diene polymer rubbers. As examples of the conjugated dienes and the unsaturated nitriles used for the conjugated diene rubbers, there can be mentioned those which are listed above with regard to the hydrogenated nitrile rubber. The aromatic vinyl compound includes, for example, styrene, α-methylstyrene and vinyltoluene.

As specific examples of the conjugated diene rubber, there can be mentioned unsaturated nitrile-conjugated diene copolymer rubbers listed above with regard to the unsaturated nitrile-conjugated diene copolymer rubber for the inner layer, and a styrene-butadiene copolymer rubber, a polybutadiene rubber, a polyisoprene rubber and natural rubber. The kind of the conjugated diene rubber is appropriately selected depending upon the particular kind of oil, leakage of which from the caulked portion of the hose should be prevented. An acrylonitrile-conjugated diene copolymer rubber (NBR) is especially preferable. The content of acrylonitrile in NBR is appropriately determined depending upon the particular oil, but is preferably in the range of 5 to 60% by weight.

The outer layer formed on the intermediate layer, which is exposed to the air, is made of a vulcanizate of an ozone-resistant rubber composition. As specific examples of the ozone-resistant rubber, there can be mentioned epichlorohydrin type rubbers such as a chloroprene rubber, an acrylic rubber, an epichlorohydrin rubber and an epichlorohydrin-ethylene oxide copolymer rubber, a chlorosulfonated polyethylene rubber, chlorinated polyethylene, and an ethylene-propylene-diene monomer terpolymer rubber (EPDM). Of these, epichlorohydrin type rubbers and a chlorosulfonated polyethylene rubber are preferable in view of the thermal resistance, oil resistance and ozone resistance.

In the second oil hose of the present invention having a two-layer structure, the inner layer is made of a vulcanizate of a composition comprising a nitrile rubber obtained by hydrogenating the conjugated-diene portion of a copolymer rubber of an unsaturated nitrile, a conjugated diene and a copolymerizable ethylenically unsaturated monomer. The amounts of the three ingredients in the copolymer rubber are 5 to 60% by weight, 35 to 94% by weight and 1 to 80% by weight, respectively, and preferably 10 to 50% by weight, 40 to 70% by weight and 10 to 50% by weight, respectively, in view of the oil resistance, thermal resistance, resistance to oil-leakage at a low temperature, and copper ion resistance.

As the inner is made of a vulcanizate of the above-mentioned hydrogenated nitrile rubber composition, a strong caulking in the connected portion of the hose is attained and the oil-leakage at a low temperature is prevented, although the second oil hose does not have an intermediate layer as possessed by the first oil hose. If an intermediate layer is interposed between the inner layer and the outer layer, the caulking in the connected portion becomes more strong.

In the second oil hose of the present invention, the outer layer formed on the inner layer, which is exposed to the air, is the same as the outer layer of the first oil hose.

The respective layers of the first oil hose and the second oil hose are made from a composition prepared by kneading together each of the above-mentioned rubbers, a vulcanizing system (including a sulfur-containing vulcanizer system and an organic peroxide vulcanizer system), a reinforcer and/or other additives such as a filler, an antioxidant, a plasticizer and a processing aid. More specifically, the first oil hose is made by a process wherein, first, a rubber composition for the inner layer is extruded through an extruder to form the inner layer, an adhesive is applied onto the inner layer, a rubber composition for the intermediate layer is extruded onto the adhesive-applied inner layer to form the intermediate layer, a braided reinforcing yarn layer is usually formed on the intermediate layer, an adhesive is applied on to the braid layer, a rubber composition for the outer layer is extruded onto the adhesive-applied intermediate layer to form the outer layer, and then the thus-formed three rubber composition layers are vulcanized whereby a hose having a three-layer structure is produced. The second oil hose is made by a process wherein the inner layer is first formed, a braided reinforcing yarn layer is formed thereon, an adhesive is applied thereon, the outer layer is formed thereon, and then the thus-formed two rubber composition layers are vulcanized whereby a hose having a two-layer structure is produced.

The vulcanization is conducted usually at a temperature of 150° to 170° C. for 30 to 60 minutes. The kind and amount of each of the additives incorporated in the rubber compositions used in the present invention are not particularly limited. The kind of the braided reinforcing yarn used in the present invention also is not particularly limited provided that the yarn has a good thermal resistance. Usually the braided reinforcing yarn is made of, for example, a polyester fiber, a nylon fiber or an aramide fiber.

The invention will now be specifically described by the following examples. In the examples, parts are by weight unless otherwise specified.

EXAMPLE 1 AND COMPARATIVE EXAMPLES 1, 2 AND 3

A hydrogenated nitrile-butadiene copolymer rubber having an acrylonitrile content of 36% by weight and an iodine value of 4 ("Zetpol 2000" supplied by Nippon Zeon Co.; hereinafter abbreviated to "HNBR-1") was used as a rubber for the inner layer. An acrylonitrile-butadiene copolymer rubber having an acrylonitrile content of 28% by weight ("Nipol DN302" supplied Nippon Zeon Co.; hereinafter abbreviated to "NBR") was used as a rubber for the intermediate layer. An epichlorohydrin-ethylene oxide copolymer rubber (CHC, "Gechron 3000" supplied by Nippon Zeon Co.) was used as a rubber for the outer layer. According to the recipe (composition A and composition B) shown in Table 1, a three layer laminate was made from each copolymer rubber. The laminate was press-vulcanized at 160° C. for 40 minutes.

For comparison, the following two-layer laminates (i), (ii) and (iii) were made: (i) a two layer laminate comprised of an inner layer made of NBR composition (composition A) and an outer layer made of the same epichlorohydrin-ethylene copolymer rubber as mentioned above (Comparative Example 1); (ii) a two layer laminate comprised of an inner layer made of HNBR-1 composition (composition B) and an outer layer made of the same epichlorohydrin-ethylene copolymer rubber as mentioned above (Comparative Example 2); and (iii) a two layer laminate comprised of an inner layer made of a rubber composition comprising a mixture (1/1 by weight) of HNBR-1 and NBR (composition C) and an outer layer made of the same epichlorohydrin-ethylene copolymer rubber as mentioned above (Comparative Example 3). Each laminate was press-vulcanized at 160° C. for 40 minutes.

TABLE 1

| Composition | A | B | C | D |
|---|---|---|---|---|
| NBR | 100 | — | 50 | — |
| HNBR-1 | — | 100 | 50 | — |
| HNBR-2 | — | — | — | 100 |
| Zinc oxide #1 | 5 | — | — | — |
| Stearic acid | 1 | 1 | 1 | 1 |
| SRF Carbon black | 80 | 60 | 70 | 60 |
| FT Carbon black | 35 | — | — | — |
| Plasticizer *1 | 8 | — | — | — |
| Plasticizer *2 | — | 5 | 5 | 5 |
| Aging stabilizer *3 | 2 | 2 | 2 | 2 |
| Aging stabilizer *4 | — | 2 | 2 | 2 |
| Sulfur | 1 | — | — | — |
| Dibenzothiazyl disulfide | 1.5 | — | — | — |
| Dicumyl peroxide (content 40%) | — | 7 | 5 | 7 |

Note:
*1 Dioctyl sebacate
*2 "Adeka Cizer C-9N" supplied by Adeka Argus Co.
*3 Polymerized product of 2,2,4-trimethyl-1,2-dihydroquinone
*4 "Naugard 445" supplied by Uniroyal Chem. Co.

Thermal resistance, oil resistance, copper ion resistance and compression set at a low temperature of each laminate were evaluated. However, the outer layer of an oil hose is not concerned with these properties, and therefore, the tests for these properties were conducted on a test sample of a two-layer (inner layer/intermediate layer) laminate (Example 1), and on test samples of a single layer (inner layer) (Comparative Examples 1, 2 and 3).

In Comparative Examples 1, 2 and 3, each composition (composition A, B or C) for making an inner layer was press-vulcanized at 160° C. for 40 minutes to prepare a test sample. In Example 1, HNBR-1-containing composition B for making an inner layer and NBR-containing composition A for making an intermediate layer were laminated together at a thickness ratio (composition A/composition B) of 1/2, and the laminate was press-vulcanized at 160° C. for 40 minutes to prepare a test sample.

The thermal resistance was evaluated by allowing a test sample to stand at 150° C. for 70 hours in a Geer oven, and then, measuring the JIS hardness. The oil resistance was evaluated by immersing a test sample in a commercially available power steering oil (Nissan genuine power steering oil) at 150° C. for 70 hours, and then, measuring the change of volume. The copper ion resistance was evaluated by coating one surface of a test sample with a copper paste (a mixture of the above-mentioned oil/100 mesh copper powder), allowing the copper paste-coated test sample to stand in a Geer oven at 120° C. and, when the sample was folded at a folding angle of 180 degree, observing the occurrence of cracks. The copper ion resistance was expressed by the time (hours) from the commencement of standing in the Geer oven to the observation of cracks when folded. The smaller the compression set at a low temperature, the smaller the oil-leakage at a low temperature. Therefore, the resistance to oil-leakage was evaluated by the compression set as measured at a temperature of −20° C., a standing time of 8 hours and a 25% compression. The evaluation results are shown in Table 2.

EXAMPLE 2

A hydrogenated NBR having an iodine value of 28, obtained by hydrogenating NBR having a butadiene content of 45% by weight, an acrylonitrile content of 25% by weight and butyl acrylate content of 30% by weight (hereinafter abbreviated to "HNBR-2"), was used as a rubber for the inner layer. A rubber composition D was prepared according to the recipe shown in Table 1. Composition D was vulcanized in the same manner as in Example 1 to prepare a test sample. The properties were evaluated by the same procedures as those described in Example 1. The results are shown in Table 2.

TABLE 2

|  | Comparative Examples | | | Examples | |
|---|---|---|---|---|---|
|  | 1 | 2 | 3 | 1 | 2 |
| Composition of inner layer | A | B | C | A/B *1 | D |
| Thermal resistance (JIS hardness change) | +10 | +3 | +10 | +3 | +5 |
| Oil resistance (volume change in %) | +2 | −1 | +1 | −1 | +5 |
| Copper ion resistance (Crack occurrence time, hr) | 48 | 480 | 72 | 480 | 336 |
| Commpression set at low temperature (%) | 52 | 92 | 75 | 61 | 65 |

Note:
*1 Laminate of intermediate layer of composition A/inner layer of composition B As seen from Table 2, a laminate having an inner layer made of a vulcanized NBR composition (composition A) exhibits a good resistance to compression set at a low temperature, but a poor copper ion resistance. A laminate having an inner layer made of a vulacanized HNBR composition (composition B) exhibits a good copper ion resistance, but a poor resistance to compression set at a low temperature. A laminate having an inner layer made of a vulcanized mixed rubber (NBR/HNBR) composition (composition C) exhibits a poor copper ion resistance and a somewhat poor resistance to compression set at a low temperature. In contrast, a laminate having an inner layer made of a vulcanized HNBR composition (composition B) and an intermediate layer made of a vulacanized NBR composition (composition A) exhibits good and well balanced copper ion resistance and resistance to compression set at a low temperature. A laminate having an inner layer made of a vulcanizate of a rubber composition (composition D) comprising a hydrogenated unsaturated nitrile-conjugated diene-ethylenically unsaturated monomer terpolymer rubber also exhibits good copper ion resistance and resistance to compression set at a low temperature.

Industrial Applicability

The oil hose of the present invention has good thermal resistance and copper ion resistance, and the connected portion of the hose to a metal pipe such as a copper pipe can be strongly caulked and thus oil leakage in the connected portion can be prevented. Therefore, the hose is useful as an automobile steering hose, a hydraulic torque converter hose and an oil cooler hose, and industrial hoses such as hydraulic hoses in general industry and construction industry.

I claim:

1. An oil hose comprised of an inner layer and an outer layer, wherein the inner layer is made of a vulcanizate of a hydrogenated nitrile rubber composition comprising a hydrogenated nitrile rubber having an iodine value not larger than 120, which is obtained by hydrogenating the conjugated diene units of a copolymer rubber composed of 10 to 50% by weight of units of an unsaturated nitrile, 40 to 70% by weight of units of a conjugated diene and 10 to 50% by weight of units of a copolymerizable ethylenically unsaturated monomer vulcanized with an organic peroxide, and the outer layer is made of a vulcanized ozone-resistant rubber composition.

2. The oil hose according to claim 1, wherein the ozone-resistant rubber is at least one rubber selected from the group consisting of an epichlorohydrin rubber, an epichlorohydrin copolymer rubber, a chlorosulfonated polyethylene rubber and a chloroprene rubber.

3. The oil hose according to claim 1, which further has a layer of a braided reinforcing yarn intervening between the inner layer and the outer layer.

4. The oil hose according to claim 1, which is a power steering hose.

5. The oil hose according to claim 1, which is a hydraulic torque converter hose.

6. The oil hose according to claim 1, which is an oil cooler hose.

7. An oil hose comprised of an inner layer, an intermediate layer and outer layer, wherein the inner layer, the intermediate layer and the outer layer are made of a vulcanized hydrogenated nitrile rubber composition, a vulcanized conjugated diene rubber composition, and a vulcanized ozone-resistant rubber composition, respectively; and wherein said hydrogenated nitrile rubber to be vulcanized has an iodine value not larger than 120 and is obtained by hydrogenating the conjugated diene units of a copolymer rubber composed of 5 to 60% by weight of units of an unsaturated nitrile monomer, 15 to 95% by weight of units of a conjugated diene monomer and 0 to 80% by weight of units of an optional copolymerizable ethylenically unsaturated monomer.

8. The oil hose according to claim 7 wherein said vulcanized hydrogenated nitrile rubber composition is vulcanized with an organic peroxide.

9. The oil hose according to claim 7, wherein the conjugated diene rubber is a copolymer rubber of acrylonitrile and a conjugated diene.

10. The oil hose according to claim 7, wherein the ozone-resistant rubber is at least one rubber selected from the group consisting of an epichlorohydrin rubber, an epichlorohydrin copolymer rubber, a chlorosulfonated polyethylene rubber and a chloroprene rubber.

11. The oil hose according to claim 7, which further has a layer of a braided reinforcing yarn intervening between the intermediate layer and the outer layer.

12. The oil hose according to claim 7, which is a power steering hose.

13. The oil hose according to claim 7, which is a hydraulic torque converter hose.

14. The oil hose according to claim 7, which is an oil cooler hose.

* * * * *